(12) United States Patent
Nohara et al.

(10) Patent No.: US 6,187,843 B1
(45) Date of Patent: *Feb. 13, 2001

(54) RUBBER COMPOSITIONS FOR TIRE TREAD DEVELOPING EXCELLENT GRIPPING PERFORMANCE

(75) Inventors: Daisuke Nohara; Kazuya Hatakeyama, both of Kodaira (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/665,883

(22) Filed: Jun. 19, 1996

(30) Foreign Application Priority Data

Jul. 5, 1995 (JP) .................................................. 7-169555
Dec. 13, 1995 (JP) .................................................. 7-324521

(51) Int. Cl.⁷ ....................................................... C08L 5/34
(52) U.S. Cl. .............................. 524/87; 524/98; 524/100; 524/236; 524/248
(58) Field of Search ............................... 524/98, 87, 100, 524/248, 236

(56) References Cited

U.S. PATENT DOCUMENTS

| | | | |
|---|---|---|---|
| 4,638,026 | * 1/1987 | Sambuis et al. | 524/98 |
| 5,064,905 | * 11/1991 | Stamhuis et al. | 525/237 |
| 5,187,236 | * 2/1993 | Coolbaugh et al. | 525/314 |
| 5,536,774 | * 7/1996 | Segatta | 524/505 |

FOREIGN PATENT DOCUMENTS

| | | |
|---|---|---|
| 271522 | 9/1989 | (DE) . |
| 139602 | 5/1985 | (EP) . |
| 251760 | 1/1988 | (EP) . |
| 59-187011 | 10/1984 | (JP) . |
| 63-10645 | 1/1988 | (JP) . |
| 63-139931 | 6/1988 | (JP) . |

OTHER PUBLICATIONS

Chemical Abstracts, vol. 98, No. 14, 1983, Columbus, Ohio, US; Abstract No. 108679, XP002016622 Abstract and SU–A–979 530 (VP Bukalov et al.) Dec. 7, 1982.

* cited by examiner

Primary Examiner—Peter D. Mulcahy
(74) Attorney, Agent, or Firm—Sughrue, Mion, Zinn, Macpeak & Seas, PLLC

(57) ABSTRACT

A rubber composition for use in a tread of a pneumatic tire comprises particular amounts of particular nitrogen-containing compound and particular proton acid or derivative thereof based on 100 parts by weight of rubber ingredient, and develops an excellent gripping performance.

7 Claims, No Drawings

RUBBER COMPOSITIONS FOR TIRE TREAD DEVELOPING EXCELLENT GRIPPING PERFORMANCE

BACKGROUND OF THE INVENTION

1. Field of the Invention

This invention relates to a rubber composition for a tire tread developing an excellent gripping performance as well as a pneumatic tire using the same.

2. Description of Related Art

Recently, it is strongly demanded to provide pneumatic tires having higher running performances accompanied with improvement of automobile performances, pavement of roads and development of expressway networks. As the running performances of the tire become higher, the automobile can be run accurately and safely at a higher speed. Particularly, the gripping performance exemplified by acceleration performance and braking performance is an important requirement in the tire.

In order to obtain a high gripping performance, there has hitherto been proposed a method wherein styrene-butadiene copolymer rubber having a high bound styrene content as a rubber having a high glass transition temperature was used in the rubber composition for the tire tread.

According to this method, however, the improvement of the gripping performance is obtained, but there is caused a problem that the value of tan θ lowers with the rise of rubber temperature during the running of the tire and hence the gripping performance rapidly lowers.

In order to prevent the degradation of the gripping performance due to the temperature rise, there is proposed a technique of using a copolymer rubber obtained by copolymerizing a monomer such as 1,3-butadiene, styrene, isoprene or the like with a methacrylate compound or acrylate compound containing diphenyl phosphate group such as diphenyl-2-methacryloyloxyethyl phosphate, diphenyl-2-acryloyloxyethyl phosphate or the like (see JP-A-59-187011). However, this technique can not be applied to natural rubber, but also undesirably damages properties inherent to a polymer such as styrene-butadiene copolymer rubber or polybutadiene rubber in accordance with the production conditions.

On the other hand, there is a method of increasing the value of tan θ in the rubber composition by using a compounding system filled with great amounts of process oil and carbon black. According to this method, the gripping performance is improved, but the fracture properties and wear resistance are considerably degraded, so that the filling amount is critical and hence it is difficult to render the gripping performance into the required high level.

There is another method wherein particular amount of particular imidazole compound or imidazoline compound and particular proton acid derivative are compounded with the rubber ingredient to increase the value of tan θ and the resulting rubber composition is used in the tire tread to improve the gripping performance (see JP-A-63-139931). In this method, the antiscorching property is somewhat improved as compared with a method described in JP-A-63-10645, but does not yet arrive at a practical level.

SUMMARY OF THE INVENTION

It is, therefore, an object of the invention to solve the aforementioned problems of the conventional techniques and to provide rubber compositions having a good scorch time and developing an excellent gripping performance as well as pneumatic tires using the same.

According to the invention, there is the provision of a rubber composition for use in a tire tread developing an excellent gripping performance, comprising 0.1–50 parts by weight of at least one nitrogen-containing compound selected from the group consisting of the following compounds (1)–(4):

(1) a lactam having a carbon number of 4–19 in a hetero-cyclic ring and represented by the following formula:

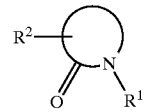

(wherein each of $R^1$ and $R^2$ is a straight or branched chain alkyl group having a carbon number of 1–8, a hydrogen atom, a phenyl group, or a phenyl group substituted with an alkyl group having a carbon number of 1–8 and they are the same or different);

(2) a tertiary amine represented by the following formula:

$$(R^3)_3N$$

(wherein $R^3$ is a straight or branched chain alkyl group having a carbon number of 1–8, a phenyl group, or a phenyl group substituted with an alkyl group having a carbon number of 1–8);

(3) an isoquinoline represented by the following formula:

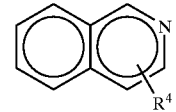

(wherein $R^4$ is a straight or branched chain alkyl group having a carbon number of 1–8, a hydrogen atom, a phenyl group, or a phenyl group substituted with an alkyl group having a carbon number of 1–8); and (4) a cyclic dipeptide represented by the following formula:

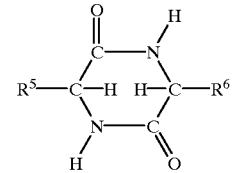

(wherein each of $R^5$ and $R^6$ is a straight or branched chain alkyl group having a carbon number of 1–8, a hydrogen atom, a phenyl group, or a phenyl group substituted with an alkyl group having a carbon number of 1–8 and they are the same or different); and 0.1–50 parts by weight of at least one compound selected from the group consisting of proton acids and derivatives thereof, based on 100 parts by weight of rubber ingredient consisting of natural rubber and/or synthetic rubber.

In the rubber composition according to the invention, the proton acid and derivative thereof include acetic acid, succinic acid, oleic acid, resin acid, maleic acid, benzoic acid, p-methoxybenzoic acid, p-chlorobenzoic acid, p-nitrobenzoic acid, cinnamic acid, d-naphthylcarboxylic acid, phthalic acid, trimellitic acid, pyromellitic acid, anhydrous phthalic acid, naphthoic acid and phenolic derivatives thereof.

In a pneumatic tire according to the invention, the above-defined rubber composition is used in a tread portion of the tire.

DESCRIPTION OF THE PREFERRED EMBODIMENTS

As the rubber ingredient used in the invention, mention may be made of natural rubber and synthetic rubber and a blend thereof. The synthetic rubber includes synthetic polyisoprene rubber, polybutadiene rubber, styrene-butadiene rubber and the like.

Among the nitrogen-containing compounds used in the invention, the lactam includes ε-caprolactam, ω-heptalactam, ω-laurolactam, N-phenyl-ω-laurolactam, and compounds in which each of $R^1$ and $R^2$ is —H or —$CH_3$. Particularly, ω-laurolactam is most preferable. The tertiary amine includes triethylamine, tributylamine, diethylmethylamine, triisobutylamine, trioctylamine, dimethylbutylamine, diisopropylethylamine, triphenylamine and the like. The isoquinoline includes,

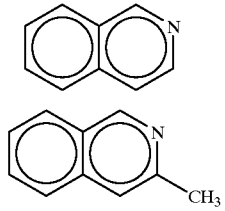

N-p-tolylisoquinoline and the like. The cyclic dipeptide includes cyclo(—Ile—Leu—), cyclo(—Phe—Val—), cyclo (-Ile-Phe-) and optical isomers thereof.

In the formulae showing the nitrogen-containing compounds, the reason why each of $R^1$–$R^6$ is restricted to an alkyl group having a carbon number of 1–8 or the like is due to the fact that if the carbon number exceeds the upper limit, the molecular weight of the nitrogen compound is too large and hence the amount of the nitrogen-containing compound compounded becomes too large. Further, the reason why the carbon number constituting the heterocyclic ring is limited to 4–19 is due to the fact that the lactams having such a carbon number are available in industry. Particularly, lactams having a carbon number of 4–12 are preferable in view of properties relating to the compounding amount and the like.

The nitrogen-containing compound used in the invention has an effect of enhancing the interaction between rubber molecules to provide a rubber composition having a large value of tan θ even at a gripping zone (about 30° C.). According to the invention, therefore, these nitrogen-containing compounds may be used alone or in admixture of 2 or more compounds.

The reason why the amount in total of the nitrogen-containing compound compounded is restricted to 0.1–50 parts by weight based on 100 parts by weight of the rubber ingredient is due to the fact that when the amount is less than 0.1 part by weight, the effect aimed at the invention can not be obtained, while when it exceeds 50 parts by weight, the effect corresponding to the increase of the amount is not obtained but also the properties after vulcanization are badly influenced to bring about the poor result.

When the nitrogen-containing compounds are compounded with the rubber ingredient, they may be mixed prior to the compounding or may separately be compounded with the rubber ingredient.

The proton acids and derivatives thereof used in the invention may be used alone or in admixture of two or more compounds.

As the phenolic derivative of the proton acid, mention may be preferably made of 4,4'-butylidene-bis(3-methyl-6-tert-butylphenol), 4,4'-thiobis(3-methyl-6-butylphenol), triethyleneglycol-bis[3-(3-tert-butyl-5-methyl-4-hydroxyphenyl) propionate], and 1,1'-bis(4-hydroxyphenyl) cyclohexane.

The reason why the amount in total of the proton acid and derivatives thereof compounded is limited to 0.1–50 parts by weight based on 100 parts by weight of the rubber ingredient is due to the fact that when the amount is less than 0.1 part by weight, the sufficient effect can not be developed, while when it exceeds 50 parts by weight, there is a possibility of causing a bad influence upon the other properties.

If necessary, various additives usually used in the field of rubber industry such as filler, softening agent, antioxidant, vulcanization accelerator, accelerator activator, vulcanizing agent and the like may be added to the rubber composition according to the invention within a range of usual amounts.

The following examples are given in illustration of the invention and are not intended as limitations thereof.

An unvulcanized rubber composition is prepared according to a compounding recipe as shown in Table 1.

TABLE 1

| Styrene-butadiene rubber | 100 parts by weight |
|---|---|
| Aromatic oil | 17 parts by weight |
| Carbon black ISAF | 75 parts by weight |
| Zinc white | 2.5 parts by weight |
| Stearic acid | 2 parts by weight |
| N-t-butyl-2-benzothiazyl sulfenamide | 1.5 parts by weight |
| Sulfur | 1.5 parts by weight |
| Bisphenolic antioxidant *1 (proton acid) | 4.5 parts by weight |
| Nitrogen-containing compound (see Table 2) | 0.03 mol |

*1: 4,4'-butylidene-bis(3-methyl-6-tert-butylphenol)

As to each of the resulting unvulcanized rubber compositions (Examples 1–5 and Comparative Examples 1–2), a Mooney scorch time $t_5$ is measured at 130° C. according to a method defined in JIS, and a value of tan θ at 30° C in a vulcanizate after the vulcanization of the unvulcanized rubber composition is measured by using a testing machine for the measurement of viscoelasticity made by Rheometrix Corp. under a condition of a dynamic strain of 1% to obtain results as shown in Table 2.

TABLE 51

|  | Comparative Example 1 | Comparative Example 2 | Example 1 | Example 2 | Example 3 | Example 4 | Example 5 |
|---|---|---|---|---|---|---|---|
| Nitrogen-containing compound | none | 1-benzyl-2-methylimidazole | ω-laurolactam | 2-pyrolidone | 1-methyl-2-pyrolidone | triethyl-amine | isoquinoline |
| Mooney scorch time $t_5$ (min.) | 12.4 | 4.8 | 20.1 | 12.7 | 20.3 | 12.0 | 22.3 |
| Value of tan δ (30° C.) | 0.318 | 0.510 | 0.511 | 0.483 | 0.471 | 0.427 | 0.444 |

As seen from Table 2, when using the nitrogen-containing compound according to the invention, the scorch time is improved as compared with Comparative Example 2 using imidazole. Furthermore, it is understood that the value of tan θ at 30° C. is improved by using the nitrogen-containing compound and proton acid according to the invention together.

An unvulcanized rubber composition is prepared according to a compounding recipe as shown in Table 3 and then vulcanized. Thereafter, the value of tan θ at 30° C. in the vulcanizate is measured in the same manner as in Example 1 to obtain results as shown in Table 4.

TABLE 3

| Styrene-butadiene rubber | 100 parts by weight |
|---|---|
| Aromatic oil | 17 parts by weight |
| Carbon black ISAF | 75 parts by weight |
| Zinc white | 2.5 parts by weight |
| Stearic acid | 2 parts by weight |
| N-t-butyl-2-benzothiazyl sulfenamide | 1.5 parts by weight |
| Sulfur | 1.5 parts by weight |
| ω-laurolactam | 3 parts by weight |
| Proton acid (see Table 4) | 4.5 parts by weight |

TABLE 4

|  | Comparative Example 3 | Example 6 | Example 7 | Example 8 |
|---|---|---|---|---|
| Proton acid | none | 4,4'-butylidene-bis(3-methyl-6-tert-butylphenol) | benzoic acid | p-methoxy-benzoic acid |
| Value of tan δ (30° C.) | 0.3751 | 0.4605 | 0.4874 | 0.4830 |

As seen from Table 4, the effect of increasing the value of tan θ is obtained by using various proton acids. Particularly, this effect is large in Examples 6–8 using 4,4'-butylidene-bis(3-methyl-6-tert-butylphenol), benzoic acid and p-methoxybenzoic acid, respectively.

A pneumatic tire having a tire size of 195/65R15 is manufactured by using in a tread a general-purpose rubber composition (Comparative Example 4), a general-purpose rubber composition compounded with 3 parts by weight of ω-laurolactam, 3.4 parts by weight of benzoic acid and 1.1 parts by weight of 4,4'-butylidene-bis(3-methyl-6-tert-butylphenol) (Example 11), a high-performance rubber composition (Comparative Example 5), or a high-performance rubber composition compounded with 5 parts by weight of ω-laurolactam and 7.5 parts by weight of 4,4'-butylidene-bis(3-methyl-6-tert-butylphenol) (Example 12).

A steering stability test on a circuit course of dry road surface is carried out by two professional test drivers. The steering stability is evaluated by evaluation points of 0: equal to control, +1: level of feeling the improvement of property by a professional driver, +2: level of feeling the improvement of property by a sensitive driver and +3: level of feeling the improvement of property by a general driver to obtain results as shown in Table 5.

TABLE 5

|  | Comparative Example 4 | Example 11 | Comparative Example 5 | Example 12 |
|---|---|---|---|---|
| ω-laurolactam | none | 3 parts by weight | none | 5 parts by weight |
| 4,4-butylidene-bis(3-methyl-6-tert-butylphenol) | none | 1.1 parts by weight | none | 7.5 parts by weight |
| Benzoic acid | none | 3.4 parts by weight | none | none |
| Evaluation point in steering stability test on dry road | control | +2 | control | +2 |

As seen from Table 5, the running performance on dry road is improved in the rubber composition according to the invention as compared with the conventional rubber composition.

A high-performance unvulcanized rubber composition is prepared according to a compounding recipe as shown in Table 6 and then vulcanized. Thereafter, the value of tan θ at 30° C. in the vulcanizate is measured in the same manner as in Example 1 to obtain results as shown in Table 7. Furthermore, the above rubber composition is used in a tread portion to manufacture a pneumatic tire having a tire size of 195/65R14 and then the steering stability on dry road is measured in the same manner as in Example 11 to obtain results as shown in Table 7. Moreover, the rubber composition of Comparative Example 7 does not contain 4,4'-butylidene-bis(3-methyl-6-tert-butylphenol).

TABLE 6

| Styrene-butadiene rubber | 100 parts by weight |
|---|---|
| Aromatic oil | 20 parts by weight |
| Carbon black ISAF | 75 parts by weight |
| Zinc white | 2.5 parts by weight |
| Stearic acid | 2 parts by weight |
| N-t-butyl-2-benzothiazyl sulfenamide | 1.5 parts by weight |
| Sulfur | 1.5 parts by weight |
| 4,4'-butylidene-bis(3-methyl-6-tert-butylphenol) | 4.5 parts by weight |

TABLE 6-continued

| Nitrogen-containing compound (see Table 7) | 0.0265 mol |
|---|---|

TABLE 7

| | Comparative Example 6 | Comparative Example 7 | Example 13 | Example 14 | Example 15 |
|---|---|---|---|---|---|
| Nitrogen-containing compound | — | ω-laurolactam | ε-caprolactam | ω-heptalactam | ω-laurolactam |
| Compounding amount (parts by weight) | 0 | 5.23 | 3.00 | 3.37 | 5.23 |
| Value of tan δ (30° C.) | 0.388 | 0.379 | 0.543 | 0.558 | 0.586 |
| Evaluation point in steering stability test on dry road | control | ±0 | +2 | +2 | +3 |

As seen from Table 7, the value of tan θ and the running performance on dry road are excellent in all examples.

As mentioned above, according to the invention, the specified amounts of the particular nitrogen-containing compound and the particular proton acid or derivative thereof are compounded with the rubber ingredient, whereby the value of tan θ in the resulting rubber composition at the gripping zone (about 30° C.) can be improved. Therefore, when such a rubber composition is used in the tread portion of the pneumatic tire, the lowering of the tan θ value accompanied with the tire temperature rise during the running of the tire is prevented and also the gripping performance in the high-speed running or the like is considerably improved. Furthermore, the antiscorching property is largely improved at the practical level.

What is claimed is:

1. A rubber composition for use in a tire tread developing an excellent gripping performance, comprising 0.1–50 parts by weight of at least one nitrogen-containing compound selected from the group consisting of the following compounds (1)–(4):

(1) a lactam having of 4–19 carbon atoms in a heterocyclic ring and represented by the following formula:

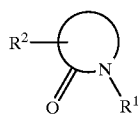

wherein each of $R^1$ and $R^2$ is a straight or branched chain alkyl group having 1–8 carbon atoms, a hydrogen atom, a phenyl group, or a phenyl group substituted with an alkyl group having 1–8 carbon atoms and they are the same or different;

(2) a tertiary amine represented by the following formula:

$(R^3)_3N$ wherein $R^3$ is a straight or branched chain alkyl group having 1–8 carbon atoms, a phenyl group, or a phenyl group substituted with an alkyl group having 1–8 carbon atoms;

(3) an isoquinoline represented by the following formula:

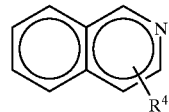

wherein $R^4$ is a straight or branched chain alkyl group having 1–8 carbon atoms, a hydrogen atom, a phenyl group, or a phenyl group substituted with an alkyl group having 1–8 carbon atoms; and (4) a cyclic dipeptide represented by the following formula:

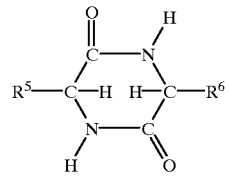

wherein each of $R^5$ and $R^6$ is a straight or branched chain alkyl group having 1–8 carbon atoms, a hydrogen atom, a phenyl group, or a phenyl group substituted with an alkyl group having 1–8 carbon atoms and they are the same or different; and 0.1–50 parts by weight of at least one compound selected from the group consisting of proton acid compounds, based on 100 parts by weight of rubber ingredient consisting of natural rubber and/or synthetic rubber; wherein said proton acid compounds are selected from the group consisting of acetic acid, succinic acid, oleic acid, resin acid, maleic acid, benzoic acid, p-methoxybenzoic acid, p-chlorobenzoic acid, p-nitrobenzoic acid, cinnamic acid, d-naphthylcarboxylic acid, phthalic acid, trimellitic acid, pyromellitic acid, anhydrous phthalic acid, naphthoic acid and bisphenolics thereof.

2. A rubber composition according to claim 1, wherein said bisphenolics are at least one compound selected from the group consisting of 4,4'-butylidene-bis(3-methyl-6-tert-butylphenol), 4,4'-thiobis(3-methyl-6-butylphenol), triethyleneglycol-bis(3-(3-tert-butyl-5-methyl-4-hydroxyphenyl) propionate), and 1,1'-bis(4-hydroxyphenyl) cyclohexane.

3. A rubber composition according to claim 1, wherein said lactam is ε-caprolactam, ω-heptalactam, ω-laurolactam, N-phenyl-ω-laurolactam, and compounds in which each of $R^1$ and $R^2$ is —H or —$CH_3$.

4. A rubber composition according to claim 1, wherein said tertiary amine is triethylamine, tributylamine, diethylmethylamine, triisobutylamine, trioctylamine, dimethylbutylamine, diisopropylethylamine or triphenylamine.

5. A rubber composition according to claim 1, wherein said isoquinoline is

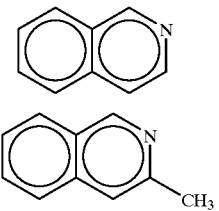

or N-p-tolylisoquinoline.

6. A rubber composition according to claim 1, wherein said cyclic dipeptide is cyclo(—Ile—Leu—), cyclo(—Phe—Val—), cyclo(—Ile—Phe—) or optical isomers thereof.

7. A pneumatic tire comprising a tread portion made from a rubber composition as claimed in claim 1.

* * * * *